United States Patent
Yoo (10) Patent No.: US 10,752,284 B2
(45) Date of Patent: Aug. 25, 2020

(54) APPARATUS AND METHOD FOR CONTROLLING REAR WHEEL STEERING

(71) Applicant: HYUNDAI MOBIS CO., LTD., Seoul (KR)

(72) Inventor: Sung Bem Yoo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 366 days.

(21) Appl. No.: 15/956,258

(22) Filed: Apr. 18, 2018

(65) Prior Publication Data

US 2019/0002020 A1    Jan. 3, 2019

(30) Foreign Application Priority Data

Jun. 30, 2017    (KR) .......................... 10-2017-0083139

(51) Int. Cl.
| | |
|---|---|
| *B62D 6/00* | (2006.01) |
| *G01L 5/22* | (2006.01) |
| *B62D 15/02* | (2006.01) |
| *B62D 7/15* | (2006.01) |

(52) U.S. Cl.
CPC ............ *B62D 6/003* (2013.01); *B62D 7/159* (2013.01); *B62D 15/021* (2013.01); *B62D 15/0265* (2013.01); *G01L 5/221* (2013.01)

(58) Field of Classification Search
None
See application file for complete search history.

(56) References Cited

U.S. PATENT DOCUMENTS

| | | | | |
|---|---|---|---|---|
| 4,700,960 A | * | 10/1987 | Miki ..................... | B62D 7/159 180/414 |
| 4,720,790 A | * | 1/1988 | Miki ..................... | B62D 7/159 180/415 |
| 4,884,647 A | * | 12/1989 | Mimuro ................ | B62D 7/159 180/415 |
| 5,027,275 A | * | 6/1991 | Sakamoto ............. | G01M 17/06 280/86.758 |
| 5,069,475 A | * | 12/1991 | Yonekawa ......... | B60G 17/0163 280/124.106 |
| 5,321,616 A | * | 6/1994 | Okuda ............... | B60G 17/0163 280/5.51 |
| 5,402,341 A | * | 3/1995 | Liubakka .............. | B62D 7/159 180/412 |

(Continued)

*Primary Examiner* — Shelley Chen
(74) *Attorney, Agent, or Firm* — Knobbe Martens Olson & Bear LLP (57) ABSTRACT

An apparatus for controlling rear wheel steering includes a steering angle sensor detecting a steering angle of a steering wheel; a vehicle speed sensor detecting a vehicle speed of a vehicle; a steering torque sensor detecting a steering torque applied to a steering shaft; and a control unit calculating a front wheel angle and a steering angle velocity from the steering angle detected by the steering angle sensor, calculating a rear wheel angle compensation factor for improving rear wheel steering responsiveness based on at least one of the steering torque detected by the steering torque sensor and the calculated steering angle velocity and a same/opposite phase gain depending on the vehicle speed detected by the vehicle speed sensor, and calculating a target rear wheel angle based on the front wheel angle, the rear wheel angle compensation factor and the same/opposite phase gain.

12 Claims, 5 Drawing Sheets

(56) References Cited

U.S. PATENT DOCUMENTS

| | | | |
|---|---|---|---|
| 6,553,293 B1* | 4/2003 | Hac | B62D 7/159 |
| | | | 180/197 |
| 8,463,506 B2* | 6/2013 | Yanagi | B60G 17/0164 |
| | | | 701/49 |
| 2002/0022916 A1* | 2/2002 | Akita | B62D 7/159 |
| | | | 701/42 |
| 2003/0060959 A1* | 3/2003 | Lin | B60T 8/1755 |
| | | | 701/70 |
| 2003/0078711 A1* | 4/2003 | Klein | B62D 7/159 |
| | | | 701/41 |
| 2006/0020382 A1* | 1/2006 | Shin | B62D 7/159 |
| | | | 701/42 |
| 2008/0119988 A1* | 5/2008 | Yasui | B62D 7/159 |
| | | | 701/41 |
| 2009/0187302 A1* | 7/2009 | Takenaka | B62D 6/04 |
| | | | 701/33.8 |
| 2009/0248248 A1* | 10/2009 | Akuta | B62D 6/002 |
| | | | 701/41 |
| 2011/0313624 A1* | 12/2011 | Yanagi | B62D 7/159 |
| | | | 701/49 |
| 2012/0203431 A1* | 8/2012 | Kojo | B62D 5/008 |
| | | | 701/41 |
| 2015/0307125 A1* | 10/2015 | Kunihiro | B62D 6/02 |
| | | | 701/42 |
| 2015/0336607 A1* | 11/2015 | Inoue | B60W 40/114 |
| | | | 701/41 |
| 2017/0334482 A1* | 11/2017 | Kojima | G01B 21/22 |
| 2018/0281547 A1* | 10/2018 | Koumura | B60G 21/055 |

* cited by examiner

APPARATUS AND METHOD FOR CONTROLLING REAR WHEEL STEERING

CROSS-REFERENCE TO RELATED APPLICATION

The present application claims priority under 35 U.S.C. § 119(a) to Korean Patent Application No. 10-2017-0083139 filed on Jun. 30, 2017 in the Korean Intellectual Property Office, which is incorporated herein by reference in its entirety.

BACKGROUND

1. Technical Field

Embodiments of the present disclosure relate to an apparatus and a method for controlling rear wheel steering, and more particularly, to an apparatus and a method for controlling rear wheel steering which improve rear wheel steering responsiveness and thereby realizes avoidance steering.

2. Related Art

An active front steering (AFS) system applied to a vehicle is provided with a steering gear ratio variable device between a steering wheel and a steering actuator. The AFS system receives a steering angle of the steering wheel, outputs a varied rotation angle to an AFS actuator and varies a steering gear ratio, thereby providing front wheel steering responsiveness and driving stability.

Further, a rear wheel steering (RWS) system receives the steering angle of the steering wheel and a vehicle speed, determines a rear wheel angle, drives an RWS actuator and controls the angle of rear wheels, thereby providing rear wheel steering responsiveness and driving stability.

Such a rear wheel steering system improves rear wheel steering responsiveness by steering the rear wheels in a direction opposite to a steering direction of front wheels and thereby decreasing a turning radius in the case where the vehicle travels at a low speed, and provides driving stability by steering the rear wheels in a direction the same as a steering direction of the front wheels and thereby decreasing a yaw rate in the case where the vehicle travels at a high speed.

When the vehicle is traveling, in order to prevent collision with an obstacle due to sudden appearance of the obstacle, it is necessary to steer not only the front wheels but also the rear wheels, and there is a need to quickly identify the avoidance steering intention of a driver due to the appearance of the obstacle and accordingly improve the rear wheel steering responsiveness to thereby prevent collision with the obstacle.

That is to say, it is necessary to quickly identify the avoidance steering intention of the driver due to the sudden appearance of the obstacle and consider steering responsiveness more preferentially than driving stability within a limit capable of achieving avoidance steering to thereby prevent collision with the obstacle. However, in the conventional art, because the rear wheels are controlled such that a priority is given to steering responsiveness when the vehicle travels at a low speed and to driving stability when the vehicle travels at a high speed, regardless of the avoidance steering intention of the driver, a problem may be caused in that it is not possible to effectively prevent collision with the obstacle which suddenly appears.

SUMMARY

Various embodiments are directed to an apparatus and a method for controlling rear wheel steering which quickly identify the avoidance steering intention of a driver and improve rear wheel steering responsiveness, thereby preventing a collision with an obstacle.

In an embodiment, an apparatus for controlling rear wheel steering may include: a steering angle sensor detecting a steering angle of a steering wheel; a vehicle speed sensor detecting a vehicle speed of a vehicle; a steering torque sensor detecting a steering torque applied to a steering shaft; and a control unit calculating a front wheel angle and a steering angle velocity from the steering angle detected by the steering angle sensor, calculating a rear wheel angle compensation factor for improving rear wheel steering responsiveness based on at least one of the steering torque detected by the steering torque sensor and the calculated steering angle velocity and a same/opposite phase gain depending on the vehicle speed detected by the vehicle speed sensor, and calculating a target rear wheel angle based on the front wheel angle, the rear wheel angle compensation factor and the same/opposite phase gain.

The rear wheel angle compensation factor may include a first rear wheel angle compensation factor which is calculated based on the steering torque, predetermined steering torque-compensation factor relationship information and the same/opposite phase gain and a second rear wheel angle compensation factor which is calculated based on the steering angle velocity, predetermined steering angle velocity-compensation factor relationship information and the same/opposite phase gain. The control unit may calculate at least one of the first rear wheel angle compensation factor and the second rear wheel angle compensation factor, and may calculate the target rear wheel angle based on at least one of the calculated first rear wheel angle compensation factor and second rear wheel angle compensation factor, the front wheel angle and the same/opposite phase gain.

In the case where a steering direction of rear wheels determined through the same/opposite phase gain is a phase opposite to a steering direction of front wheels, the control unit may calculate at least one of the first rear wheel angle compensation factor and the second rear wheel angle compensation factor such that a larger target rear wheel angle is calculated by calculating the target rear wheel angle in consideration of at least one of the first rear wheel angle compensation factor and the second rear wheel angle compensation factor.

In the case where a steering direction of rear wheels determined through the same/opposite phase gain is a phase the same as a steering direction of front wheels, the control unit may calculate at least one of the first rear wheel angle compensation factor and the second rear wheel angle compensation factor such that a smaller target rear wheel angle is calculated by calculating the target rear wheel angle in consideration of at least one of the first rear wheel angle compensation factor and the second rear wheel angle compensation factor.

When calculating at least one of the first rear wheel angle compensation factor and the second rear wheel angle compensation factor, the control unit may calculate the first rear wheel angle compensation factor only when the steering torque is equal to or larger than a predetermined reference torque and may calculate the second rear wheel angle compensation factor only when the steering angle velocity is equal to or larger than a predetermined reference angle velocity.

When calculating the target rear wheel angle, the control unit may calculate the target rear wheel angle in additional consideration of a rear wheel steering gain depending on the steering angle.

In an embodiment, a method for controlling rear wheel steering may include: receiving a steering angle, a vehicle speed and a steering torque from a steering angle sensor, a vehicle speed sensor and a steering torque sensor, respectively, and calculating a front wheel angle and a steering angle velocity from the received steering angle, by a control unit; calculating a rear wheel angle compensation factor for improving rear wheel steering responsiveness, based on at least one of the steering torque and the steering angle velocity and a same/opposite phase gain depending on the vehicle speed, by the control unit; and calculating a target rear wheel angle based on the front wheel angle, the rear wheel angle compensation factor and the same/opposite phase gain, by the control unit.

The rear wheel angle compensation factor may include a first rear wheel angle compensation factor which is calculated based on the steering torque, predetermined steering torque-compensation factor relationship information and the same/opposite phase gain and a second rear wheel angle compensation factor which is calculated based on the steering angle velocity, predetermined steering angle velocity-compensation factor relationship information and the same/opposite phase gain. In the calculating of the rear wheel angle compensation factor, the control unit may calculate at least one of the first rear wheel angle compensation factor and the second rear wheel angle compensation factor. In the calculating of the target rear wheel angle, the control unit may calculate the target rear wheel angle based on at least one of the calculated first rear wheel angle compensation factor and second rear wheel angle compensation factor, the front wheel angle and the same/opposite phase gain.

In the calculating of the rear wheel angle compensation factor, in the case where a steering direction of rear wheels determined through the same/opposite phase gain is a phase opposite to a steering direction of front wheels, the control unit may calculate at least one of the first rear wheel angle compensation factor and the second rear wheel angle compensation factor such that a larger target rear wheel angle is calculated by calculating the target rear wheel angle in consideration of at least one of the first rear wheel angle compensation factor and the second rear wheel angle compensation factor.

In the calculating of the rear wheel angle compensation factor, in the case where a steering direction of rear wheels determined through the same/opposite phase gain is a phase the same as a steering direction of front wheels, the control unit may calculate at least one of the first rear wheel angle compensation factor and the second rear wheel angle compensation factor such that a smaller target rear wheel angle is calculated by calculating the target rear wheel angle in consideration of at least one of the first rear wheel angle compensation factor and the second rear wheel angle compensation factor.

In the calculating of the rear wheel angle compensation factor, when calculating at least one of the first rear wheel angle compensation factor and the second rear wheel angle compensation factor, the control unit may calculate the first rear wheel angle compensation factor only when the steering torque is equal to or larger than a predetermined reference torque and may calculate the second rear wheel angle compensation factor only when the steering angle velocity is equal to or larger than a predetermined reference angle velocity.

In the calculating of the target rear wheel angle, the control unit may calculate the target rear wheel angle in additional consideration of a rear wheel steering gain depending on the steering angle.

According to the embodiments of the present disclosure, the simplification of a steering system may be realized by quickly identifying the avoidance steering intention of a driver through using the steering system mounted to an existing vehicle without a separate device such as a sensor, a cost saving effect may be achieved by controlling rear wheel steering through applying only a logic for improving steering responsiveness without a separate device for compensating a rear wheel angle, and a collision with an obstacle may be effectively prevented by momentarily improving steering responsiveness even when the vehicle travels at a low speed, a medium speed and a high speed.

DETAILED DESCRIPTION

Hereinafter, an apparatus and a method for controlling rear wheel steering will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
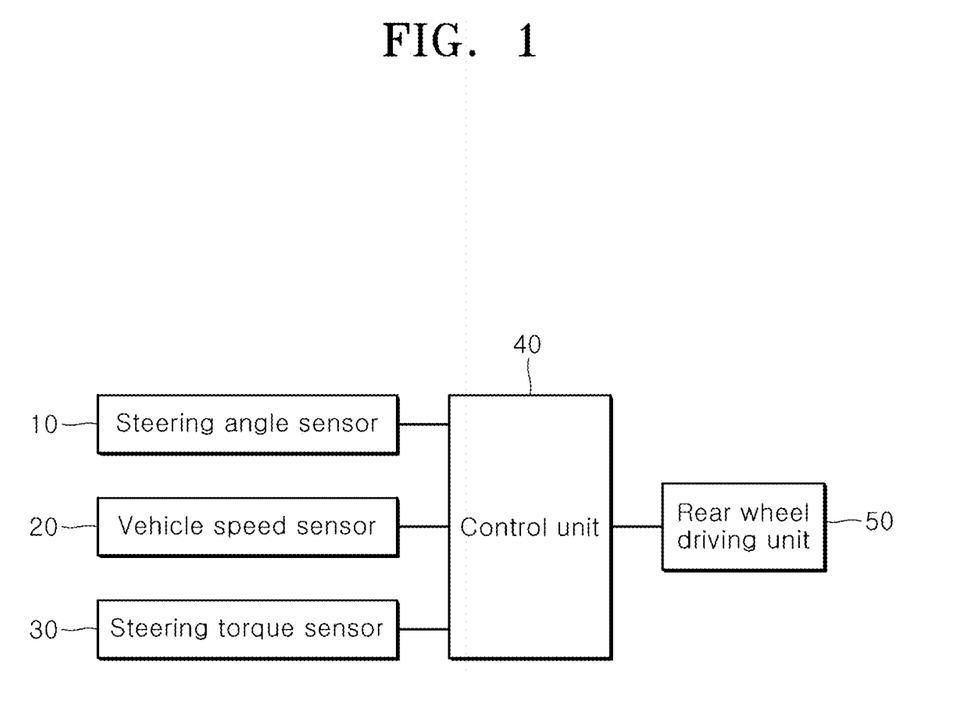
FIG. 1 is a block configuration diagram to assist in the explanation of an apparatus for controlling rear wheel steering in accordance with an embodiment of the present disclosure.
Figure 2:
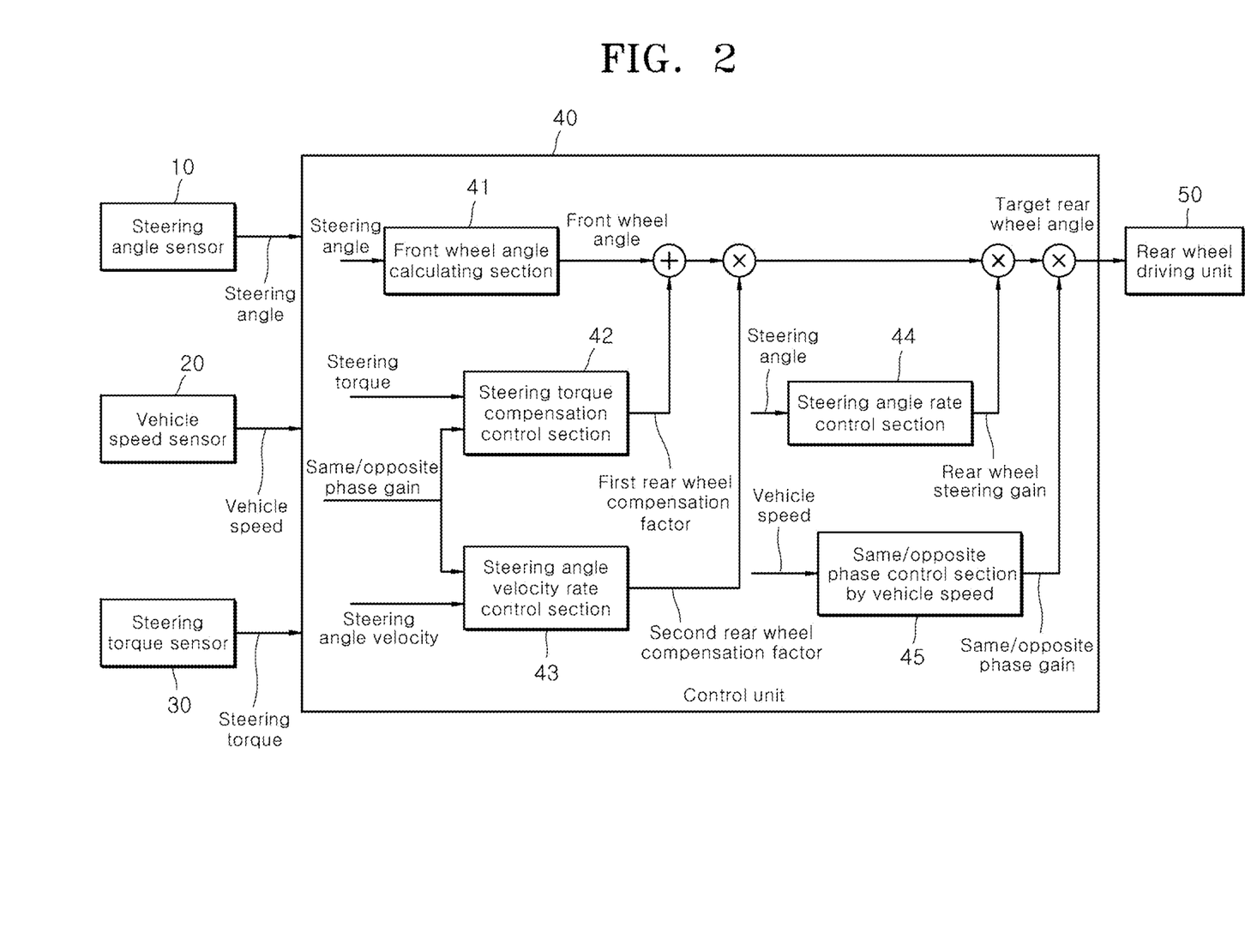
FIG. 2 is a block configuration diagram to assist in the explanation of the detailed configuration of a control unit and an example of calculating a target rear wheel angle in the apparatus for controlling rear wheel steering in accordance with the embodiment of the present disclosure.

FIG. 1 is a block configuration diagram to assist in the explanation of an apparatus for controlling rear wheel steering in accordance with an embodiment of the present disclosure, and FIG. 2 is a block configuration diagram to assist in the explanation of the detailed configuration of a control unit and an example of calculating a target rear wheel angle in the apparatus for controlling rear wheel steering in accordance with the embodiment of the present disclosure.

Referring to FIGS. 1 and 2, the apparatus for controlling rear wheel steering in accordance with the embodiment of the present disclosure may include a steering angle sensor 10, a vehicle speed sensor 20, a steering torque sensor 30, a control unit 40 and a rear wheel driving unit 50. The control unit 40 may include a front wheel angle calculating section 41, a steering torque compensation control section 42, a steering angle velocity rate control section 43, a steering angle rate control section 44 and a same/opposite phase control section by vehicle speed 45.

The steering angle sensor 10 may detect the steering angle of a steering wheel which is operated by a driver and transfer the steering angle to the control unit 40. The detected steering angle may be used to calculate a front wheel angle, a steering angle velocity and a rear wheel steering gain as will be described later.

The vehicle speed sensor 20 may detect the vehicle speed of a vehicle which is traveling and transfer the vehicle speed to the control unit 40. As the vehicle speed sensor 20, all of various sensors such as a sensor which detects a vehicle speed using the rotation speed of a wheel, a sensor which detects a vehicle speed by measuring the rpm (revolutions per minute) of an engine and a sensor which detects a vehicle speed using a global positioning system (GPS) may be included. The detected vehicle speed may be used to calculate a same/opposite phase gain depending on a vehicle speed as will be described later.

The steering torque sensor 30 may detect a steering torque that is applied to a steering shaft as the driver steers the steering wheel and transfer the steering torque to the control unit 40. The detected steering torque may be used to calculate a rear wheel angle compensation factor for improving rear wheel steering responsiveness as will be described later.

Hereafter, the operation of the control unit 40 which calculates a target rear wheel angle based on the detected values inputted from the respective sensors described above will be explained in detail through the detailed configuration of the control unit 40.

The front wheel angle calculating section 41 may calculate a front wheel angle from the steering angle inputted thereto. The front wheel angle calculating section 41 may calculate a front wheel angle by multiplying the steering angle and a predetermined front wheel steering rate (a ratio of front wheel steering to steering wheel steering), or may calculate a front wheel angle through a predetermined steering angle-front wheel angle map or lookup table or a function of a front wheel angle for a steering angle.

The same/opposite phase control section by vehicle speed 45 may receive a vehicle speed and calculate a same/opposite phase gain according to the vehicle speed. As aforementioned, a rear wheel steering system improves rear wheel steering responsiveness by steering rear wheels in a direction opposite to a steering direction of front wheels and thereby decreasing a turning radius in the case where the vehicle travels at a low speed, and provides driving stability by steering the rear wheels in a direction the same as a steering direction of the front wheels and thereby decreasing a yaw rate in the case where the vehicle travels at a high speed.

According to this fact, the same/opposite phase control section by vehicle speed 45 may calculate a same/opposite phase gain for steering the rear wheels in a direction opposite to a steering direction of the front wheels, that is, an opposite phase, in the case where a vehicle speed equal to or faster than (or faster than) a predetermined reference vehicle speed (e.g.: 40 Km/h or 50 Km/h) is detected, and may calculate a same/opposite phase gain for steering the rear wheels in a direction the same as a steering direction of the front wheels, that is, the same phase, in the case where a vehicle speed slower than (or equal to or slower than) the predetermined reference vehicle speed is detected.

The same/opposite phase gain may be determined as different values according to vehicle speeds to differently control a rear wheel angle according to the vehicle speeds, and the same/opposite phase control section by vehicle speed 45 may provide a vehicle speed-same/opposite phase gain map or lookup table or a function of a same/opposite phase gain for a vehicle speed, to calculate a same/opposite phase gain depending on a vehicle speed.

A target rear wheel angle may be calculated by applying the same/opposite phase gain calculated as described above, to a front wheel angle (for example, as front wheel angle X same/opposite phase gain).

In this regard, in the present embodiment, in order to quickly identify the avoidance steering intention of the driver and accordingly improve rear wheel steering responsiveness to thereby effectively prevent collision with an obstacle, a target rear wheel angle may be calculated by considering not only a front wheel angle and a same/opposite phase gain but also a rear wheel angle compensation factor calculated from at least one of a steering torque and a steering angle velocity.

Namely, the control unit 40 may calculate a front wheel angle and a steering angle velocity from a steering angle detected by the steering angle sensor 10, may calculate a rear wheel angle compensation factor for improving rear wheel steering responsiveness based on at least one of a steering torque detected by the steering torque sensor 30 and the calculated steering angle velocity and a same/opposite phase gain depending on a vehicle speed detected by the vehicle speed sensor 20, and may calculate a target rear wheel angle based on the front wheel angle, the rear wheel angle compensation factor and the same/opposite phase gain.

Describing the meaning of this, because an urgent steering operation of the driver for preventing collision with an obstacle which suddenly appears may be identified through a steering torque or a steering angle velocity, in the present embodiment, a rear wheel angle may be compensated by calculating a rear wheel angle compensation factor through receiving at least one of a steering torque and a steering angle velocity, and the rear wheel angle compensation factor serves as a parameter for compensating a rear wheel angle and thereby improving steering responsiveness.

The rear wheel angle compensation factor may include a first rear wheel angle compensation factor calculated from a steering torque and a second rear wheel angle compensation factor calculated from a steering angle velocity. Hereafter, a process of calculating the first rear wheel angle compensation factor and the second rear wheel angle compensation factor and a process of calculating a target rear wheel angle based on a front wheel angle, a same/opposite phase gain and the first and second rear wheel angle compensation factors will be described.

The steering torque compensation control section 42 may calculate the first rear wheel angle compensation factor based on a steering torque, predetermined steering torque-compensation factor relationship information and a same/opposite phase gain. The steering torque-compensation factor relationship information means relationship information between an inputted steering torque and a first rear wheel angle compensation factor that determines a compensation amount for a rear wheel angle depending on the steering torque.

The first rear wheel angle compensation factor may be calculated as a specific angle or a gain value for compensating a rear wheel angle, and descriptions thereof will be made later as a concrete example.

In the case where a steering direction of the rear wheels determined through an inputted same/opposite phase gain is a phase opposite to a steering direction of the front wheels, the steering torque compensation control section 42 may calculate a first rear wheel angle compensation factor to cause a larger target rear wheel angle to be calculated by calculating the target rear wheel angle in consideration of the first rear wheel angle compensation factor.

In detail, in the case where a driving speed of the vehicle is a low speed and thus a steering direction of the rear wheels determined through a same/opposite phase gain is a phase opposite to a steering direction of the front wheels, a turning radius decreases as a target rear wheel angle increases (that is, the risk of collision decreases). Therefore, when compared to the case where a target rear wheel angle is calculated by not considering a first rear wheel angle compensation factor (that is, by using only a front wheel angle and a same/opposite phase gain), by considering the first rear wheel angle compensation factor, the first rear wheel angle compensation factor may be calculated such that a larger target rear wheel angle is calculated (e.g.: the first rear wheel angle compensation factor is calculated as a positive (+) value (in the case of a specific angle) or a value equal to or greater than 1 (in the case of a gain).

Conversely, in the case where a steering direction of the rear wheels determined through an inputted same/opposite phase gain is a phase the same as a steering direction of the front wheels, the steering torque compensation control section 42 may calculate a first rear wheel angle compensation factor to cause a smaller target rear wheel angle to be calculated by calculating the target rear wheel angle in consideration of the first rear wheel angle compensation factor.

In detail, in the case where a driving speed of the vehicle is a high speed and thus a steering direction of the rear wheels determined through a same/opposite phase gain is a phase the same as a steering direction of the front wheels, a yaw rate of the vehicle increases as a target rear wheel angle decreases (that is, the risk of collision decreases). Therefore, when compared to the case where a target rear wheel angle is calculated by not considering a first rear wheel angle compensation factor (that is, by using only a front wheel angle and a same/opposite phase gain), by considering the first rear wheel angle compensation factor, the first rear wheel angle compensation factor may be calculated such that a smaller target rear wheel angle is calculated (e.g.: the first rear wheel angle compensation factor is calculated as a negative (−) value (in the case of a specific angle) or a value less than 1 (in the case of a gain).

In order to perform the above-described operations, the first rear wheel angle compensation factor which is differently calculated depending on a same/opposite phase gain may be set in the steering torque-compensation factor relationship information.

Meanwhile, the steering torque compensation control section 42 may calculate the first rear wheel angle compensation factor only in the case where a steering torque is equal to or larger than a predetermined reference torque. That is to say, in the case where a rear wheel angle is compensated by calculating the first rear wheel angle compensation factor according to all inputted steering torques, driving stability may deteriorate although rear wheel steering responsiveness is improved. Therefore, only in the case where an inputted steering torque is equal to or larger than the predetermined reference torque, it is determined that there is an obstacle avoidance steering intention according to the driver's sudden steering operation, and the first rear wheel angle compensation factor for improving the rear wheel steering responsiveness may be calculated. The reference torque may be variously set depending on a specification of a rear wheel steering system and a designer's intention, and may be set in advance in the steering torque-compensation factor relationship information.

Due to this fact, the steering torque compensation control section 42 may receive a steering torque and a same/opposite phase gain and calculate the first rear wheel angle compensation factor by referring to the steering torque-compensation factor relationship information, and the steering torque-compensation factor relationship information may be set in various schemes such as a map, a lookup table or a function of the first rear wheel angle compensation factor for a steering torque.

The steering angle velocity rate control section 43 may calculate the second rear wheel angle compensation factor based on a steering angle velocity, predetermined steering angle velocity-compensation factor relationship information and a same/opposite phase gain. The steering angle velocity-compensation factor relationship information means relationship information between an inputted steering angle velocity and the second rear wheel angle compensation factor that determines a compensation amount for a rear wheel angle depending on the steering angle velocity.

The second rear wheel angle compensation factor may be calculated as a specific angle or a gain value for compensating a rear wheel angle, and descriptions thereof will be made later as a concrete example.

In the case where a steering direction of the rear wheels determined through an inputted same/opposite phase gain is a phase opposite to a steering direction of the front wheels, the steering angle velocity rate control section 43 may calculate the second rear wheel angle compensation factor to cause a larger target rear wheel angle to be calculated by calculating the target rear wheel angle in consideration of the second rear wheel angle compensation factor.

In detail, in the case where a driving speed of the vehicle is a low speed and thus a steering direction of the rear wheels determined through a same/opposite phase gain is a phase opposite to a steering direction of the front wheels, a turning radius decreases as a target rear wheel angle increases (that is, the risk of collision decreases). Therefore, when compared to the case where a target rear wheel angle is calculated by not considering a second rear wheel angle compensation factor (that is, by using only a front wheel angle and a same/opposite phase gain), by considering the second rear wheel angle compensation factor, the second rear wheel angle compensation factor may be calculated such that a larger target rear wheel angle is calculated (e.g.: the second rear wheel angle compensation factor is calculated as a positive (+) value (in the case of a specific angle) or a value equal to or greater than 1 (in the case of a gain).

Conversely, in the case where a steering direction of the rear wheels determined through an inputted same/opposite phase gain is a phase the same as a steering direction of the front wheels, the steering angle velocity rate control section 43 may calculate the second rear wheel angle compensation factor to cause a smaller target rear wheel angle to be calculated by calculating the target rear wheel angle in consideration of the second rear wheel angle compensation factor.

In detail, in the case where a driving speed of the vehicle is a high speed and thus a steering direction of the rear wheels determined through a same/opposite phase gain is a phase the same as a steering direction of the front wheels, a yaw rate of the vehicle increases as a target rear wheel angle decreases (that is, the risk of collision decreases). Therefore, when compared to the case where a target rear wheel angle is calculated by not considering a second rear wheel angle compensation factor (that is, by using only a front wheel angle and a same/opposite phase gain), by considering the second rear wheel angle compensation factor, the second rear wheel angle compensation factor may be calculated such that a smaller target rear wheel angle is calculated (e.g.: the second rear wheel angle compensation factor is calculated as a negative (−) value (in the case of a specific angle) or a value less than 1 (in the case of a gain).

In order to perform the above-described operations, the second rear wheel angle compensation factor which is differently calculated depending on a same/opposite phase gain may be set in the steering angle velocity-compensation factor relationship information.

Meanwhile, the steering angle velocity rate control section 43 may calculate the second rear wheel angle compensation factor only in the case where a steering angle velocity is equal to or larger than a predetermined reference angle velocity. That is to say, in the case where a rear wheel angle is compensated by calculating the second rear wheel angle compensation factor according to all inputted steering angle velocities, driving stability may deteriorate although rear wheel steering responsiveness is improved. Therefore, only in the case where an inputted steering angle velocity is equal to or larger than the predetermined reference angle velocity, it is determined that there is an obstacle avoidance steering intention according to the driver's sudden steering operation, and the second rear wheel angle compensation factor for improving the rear wheel steering responsiveness may be calculated. The reference angle velocity may be variously set depending on a specification of a rear wheel steering system and a designer's intention, and may be set in advance in the steering angle velocity-compensation factor relationship information.

Due to this fact, the steering angle velocity rate control section 43 may receive a steering angle velocity and a same/opposite phase gain and calculate the second rear wheel angle compensation factor by referring to the steering angle velocity-compensation factor relationship information, and the steering angle velocity-compensation factor relationship information may be set in various schemes such as a map, a lookup table or a function of the second rear wheel angle compensation factor for a steering angle velocity.

The control unit 40 may calculate at least one of the first rear wheel angle compensation factor and the second rear wheel angle compensation factor, and may calculate a target rear wheel angle based on at least one of the calculated first rear wheel angle compensation factor and second rear wheel angle compensation factor, a front wheel angle and a same/opposite phase gain. In other words, by considering not only a front wheel angle and a same/opposite phase gain but also at least one of the first rear wheel angle compensation factor and the second rear wheel angle compensation factor, it is possible to calculate a target rear wheel angle with improved rear wheel steering responsiveness.

In order to accurately identify the driver's obstacle avoidance steering intention, both the first rear wheel angle compensation factor and the second rear wheel angle compensation factor may be calculated from a steering torque and a steering angle velocity, respectively, and accordingly, in order to calculate a target rear wheel angle with improved steering responsiveness, a target rear wheel angle may be calculated in consideration of both the first rear wheel angle compensation factor and the second rear wheel angle compensation factor.

The steering angle rate control section 44 may receive a steering angle and calculate a rear wheel steering gain depending on the steering angle. The rear wheel steering gain is a parameter for proportionally controlling a rear wheel angle depending on a steering angle and thereby improving rear wheel steering responsiveness. The steering angle rate control section 44 may provide a steering angle-gain map or lookup table for calculating a rear wheel steering gain depending on a steering angle or a function of the rear wheel steering gain for a steering angle.

Accordingly, the control unit 40 may finally calculate a target rear wheel angle based on a front wheel angle, first and second rear wheel angle compensation factors, a same/opposite phase gain and a rear wheel steering gain.

The rear wheel driving unit 50 may receive a target rear wheel angle from the control unit 40, and may steer the rear wheels through an RWS actuator (not shown) and a speed reducer (not shown) such that a rear wheel angle becomes the target rear wheel angle.

While it is described in the present embodiment that the front wheel angle calculating section 41, the steering torque compensation control section 42, the steering angle velocity rate control section 43, the steering angle rate control section 44 and the same/opposite phase control section by vehicle speed 45 are components which are separated in the control unit 40, it is to be noted that, according to an embodiment, they may be embodied as components which are integrated in the control unit 40.

Next, a process of calculating a target rear wheel angle based on a front wheel angle, first and second rear wheel angle compensation factors, a same/opposite phase gain and a rear wheel steering gain will be described below with reference to FIG. 2 as an example of a concrete calculation.

According to the example of FIG. 2, a target rear wheel angle may be calculated as in the following Equation 1.

(Front wheel angle+first rear wheel angle compensation factor)×second rear wheel angle compensation factor×rear wheel steering gain×same/opposite phase gain [Equation 1]

The first rear wheel angle compensation factor and the second rear wheel angle compensation factor may be calculated as specific angles or gains for compensating a rear wheel angle, as described above. Accordingly, in FIG. 2, the first rear wheel angle compensation factor is calculated as a specific angle and is summed with a front wheel angle, and the second rear wheel angle compensation factor is calculated as a gain and is multiplied with a summed result of the front wheel angle and the first rear wheel angle compensation factor. By multiplying the rear wheel steering gain and the same/opposite phase gain to a result thereof, the target rear wheel angle is calculated.

In the case where a steering direction of the rear wheels determined through the same/opposite phase gain is a phase opposite to a steering direction of the front wheels, the first rear wheel angle compensation factor may be calculated as a positive (+) value and the second rear wheel angle compensation factor may be calculated as a value equal to or greater than 1. As a result, the target rear wheel angle according to the Equation 1 may be calculated as a larger value in comparison with the case where the first and second rear wheel angle compensation factors are not considered, whereby rear wheel steering responsiveness may be improved.

Conversely, in the case where a steering direction of the rear wheels determined through the same/opposite phase gain is a phase the same as a steering direction of the front wheels, the first rear wheel angle compensation factor may be calculated as a negative (−) value and the second rear wheel angle compensation factor may be calculated as a positive value less than 1. As a result, the target rear wheel angle according to the Equation 1 may be calculated as a smaller value in comparison with the case where the first and second rear wheel angle compensation factors are not considered, whereby rear wheel steering responsiveness may be improved.

While it was described as an example in FIG. 2 that the first rear wheel angle compensation factor is calculated as a specific angle and the second rear wheel angle compensation factor is calculated as a specific gain, it is to be noted that, according to an embodiment, both the first and second rear wheel angle compensation factors may be calculated as specific angles and in this case, a target rear wheel angle may be calculated as in the following Equation 2.

(Front wheel angle+first rear wheel angle compensation factor+second rear wheel angle compensation factor)×rear wheel steering gain×same/opposite phase gain [Equation 2]

Also in accordance with the Equation 2, in the case where a steering direction of the rear wheels determined through the same/opposite phase gain is a phase opposite to or the same as a steering direction of the front wheels, the first and second rear wheel angle compensation factors may be calculated as positive (+) or negative (−) values and thereby rear wheel steering responsiveness is improved in the same way.

Moreover, according to an embodiment, both the first and second rear wheel angle compensation factors may be calculated as gains, and in this case, a target rear wheel angle may be calculated as in the following Equation 3.

Front wheel angle×first rear wheel angle compensation factor×second rear wheel angle compensation factor×rear wheel steering gain×same/opposite phase gain [Equation 3]

Also in accordance with the Equation 3, in the case where a steering direction of the rear wheels determined through the same/opposite phase gain is a phase opposite to or the same as a steering direction of the front wheels, the first and second rear wheel angle compensation factors may be calculated as values equal to or greater than 1 or positive values less than 1 and thereby rear wheel steering responsiveness is improved in the same way.

The above-described process of calculating a target rear wheel angle is nothing but a mere example for facilitating the understanding of the present embodiment. Therefore, it is to be noted that the present embodiment may include all configurations in which a target rear wheel angle is calculated in a direction of increasing a rear wheel angle in the case of an opposite phase and in a direction of decreasing a rear wheel angle in the case of the same phase, through rear wheel angle compensation factors calculated from a steering torque and a steering angle velocity.

Figure 3:
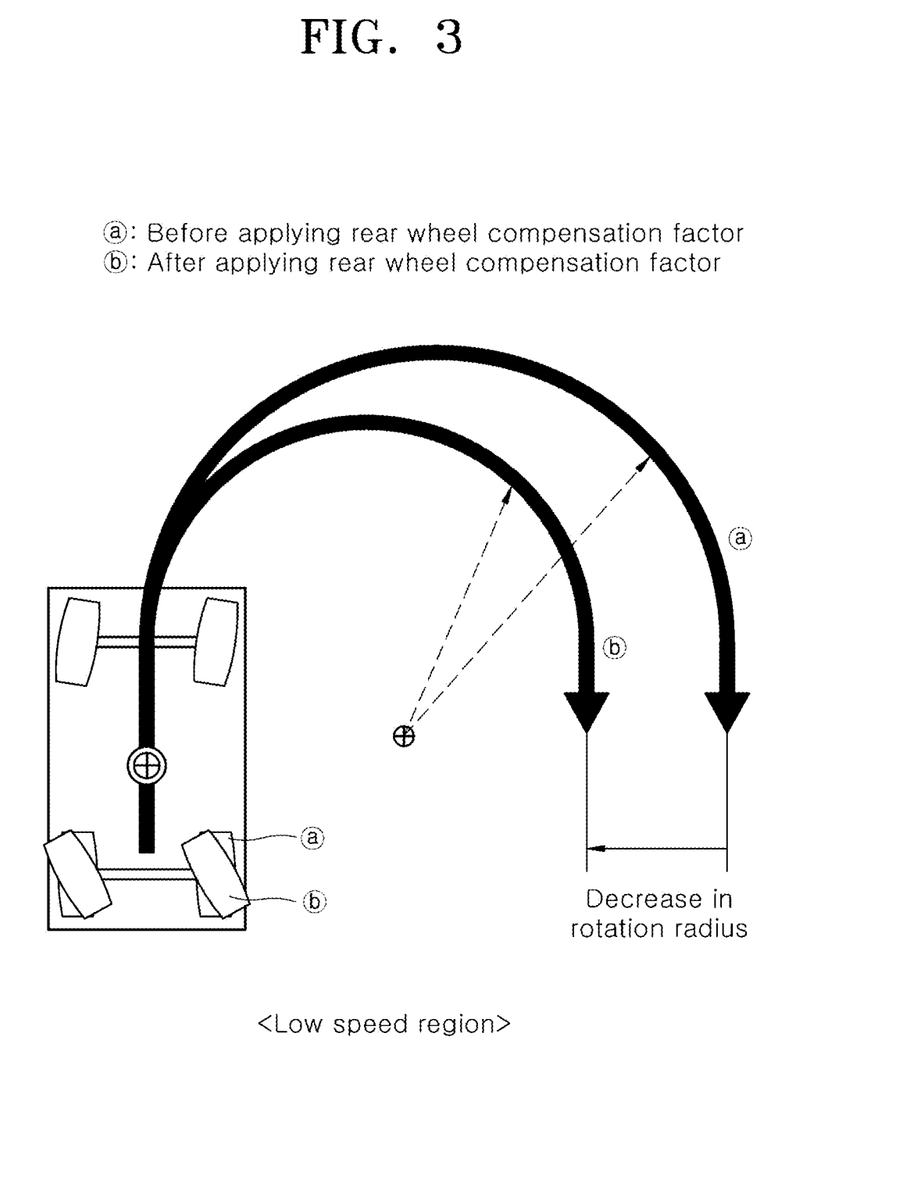
FIG. 3 is a representation of an example of a view to assist in the explanation of the behavior state of a vehicle in the case where the vehicle to which the apparatus for controlling rear wheel steering in accordance with the embodiment of the present disclosure is applied travels at a low speed.
Figure 4:
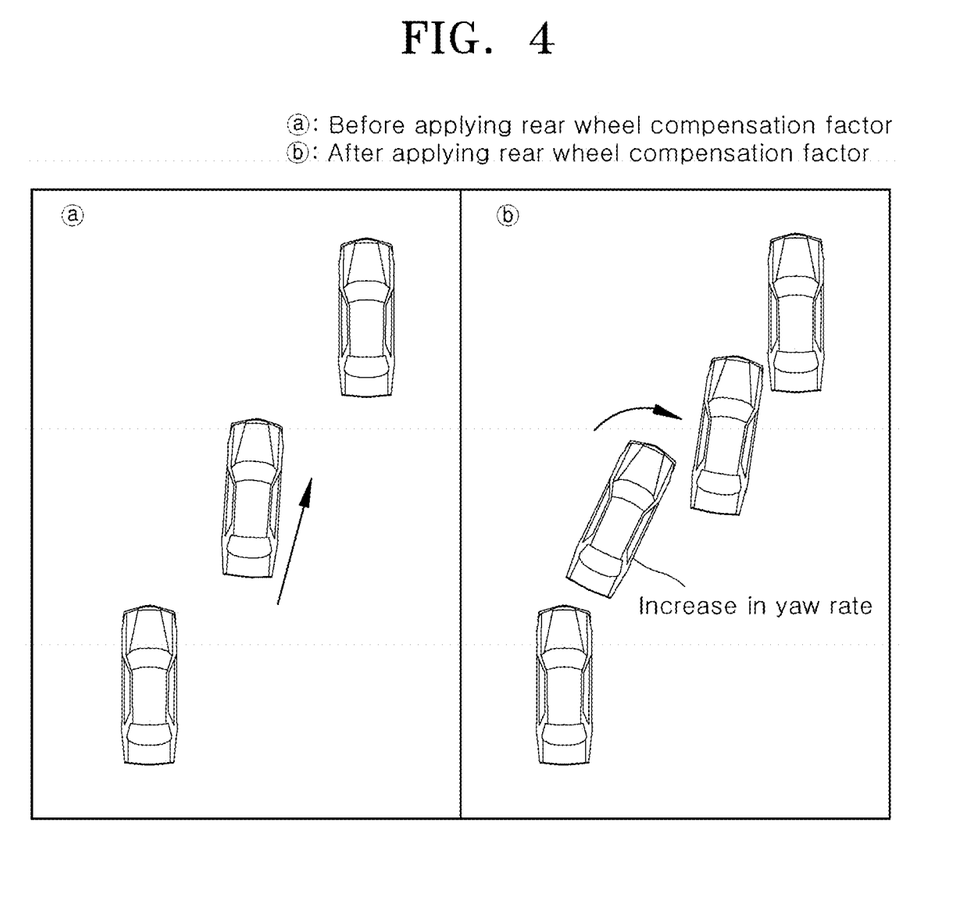
FIG. 4 is a representation of an example of a view to assist in the explanation of the behavior state of a vehicle in the case where the vehicle to which the apparatus for controlling rear wheel steering in accordance with the embodiment of the present disclosure is applied travels at a high speed.

FIG. 3 is a representation of an example of a view to assist in the explanation of the behavior state of a vehicle in the case where the vehicle to which the apparatus for controlling rear wheel steering in accordance with the embodiment of the present disclosure is applied travels at a low speed, and FIG. 4 is a representation of an example of a view to assist in the explanation of the behavior state of a vehicle in the case where the vehicle to which the apparatus for controlling rear wheel steering in accordance with the embodiment of the present disclosure is applied travels at a high speed.

Referring to FIG. 3, in the case where a vehicle travels at a low speed, since a steering direction of rear wheels is a phase opposite to a steering direction of front wheels and the magnitude of a rear wheel angle increases to decrease a turning radius, steering responsiveness may be improved and thereby collision with an obstacle may be effectively prevented.

Referring to FIG. 4, in the case where a vehicle travels at a high speed, since a steering direction of rear wheels is a phase the same a steering direction of front wheels and the magnitude of a rear wheel angle decreases to increase a yaw rate, steering responsiveness may be improved and thereby collision with an obstacle may be effectively prevented.

Figure 5:
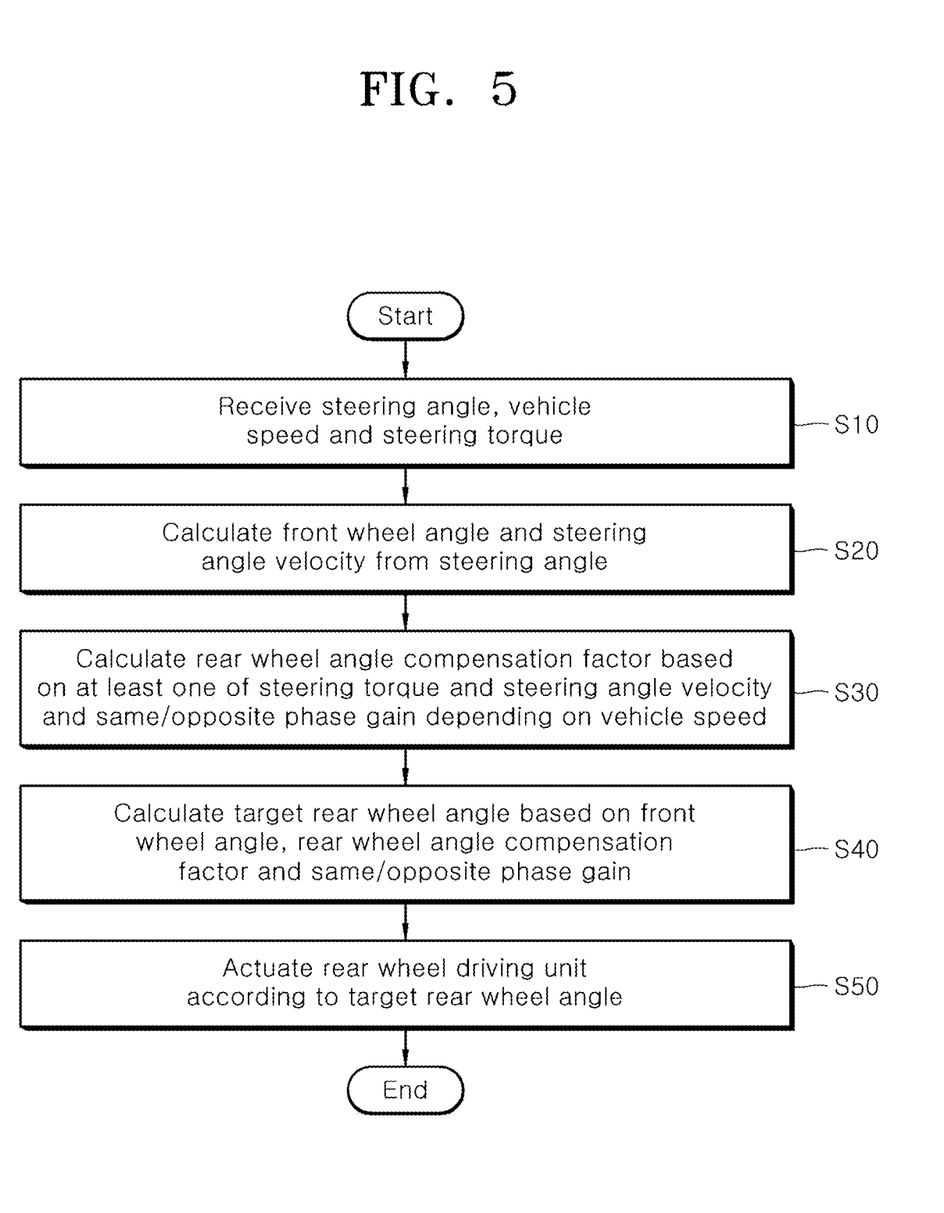
FIG. 5 is a flow chart to assist in the explanation of a method for controlling rear wheel steering in accordance with an embodiment of the present disclosure.

FIG. 5 is a flow chart to assist in the explanation of a method for controlling rear wheel steering in accordance with an embodiment of the present disclosure.

Describing the method for controlling rear wheel steering in accordance with the embodiment of the present disclosure with reference to FIG. 5, first, the control unit 40 receives a steering angle, a vehicle speed and a steering torque from the steering angle sensor 10, the vehicle speed sensor 20 and the steering torque sensor 30, respectively (S10).

The control unit 40 calculates a front wheel angle and a steering angle velocity from the received steering angle (S20).

The control unit 40 calculates a rear wheel angle compensation factor for improving rear wheel steering responsiveness, based on at least one of the steering torque and the steering angle velocity and a same/opposite phase gain depending on the vehicle speed (S30).

The rear wheel angle compensation factor may include a first rear wheel angle compensation factor which is calculated based on the steering torque, predetermined steering torque-compensation factor relationship information and the same/opposite phase gain and a second rear wheel angle compensation factor which is calculated based on the steering angle velocity, predetermined steering angle velocity-compensation factor relationship information and the same/opposite phase gain.

The control unit 40 may calculate at least one of the first rear wheel angle compensation factor and the second rear wheel angle compensation factor. In this regard, in order to accurately identify the obstacle avoidance steering intention of a driver, the first rear wheel angle compensation factor and the second rear wheel angle compensation factor may be calculated in consideration of both the steering torque and the steering angle velocity.

In the case where a steering direction of rear wheels determined through the same/opposite phase gain is a phase opposite to a steering direction of front wheels, the control unit 40 may calculate at least one of the first rear wheel angle compensation factor and the second rear wheel angle compensation factor such that a larger target rear wheel angle is calculated by calculating the target rear wheel angle in consideration of at least one of the first rear wheel angle compensation factor and the second rear wheel angle compensation factor.

Conversely, in the case where a steering direction of rear wheels determined through the same/opposite phase gain is a phase the same as a steering direction of front wheels, the control unit 40 may calculate at least one of the first rear wheel angle compensation factor and the second rear wheel angle compensation factor such that a smaller target rear wheel angle is calculated by calculating the target rear wheel angle in consideration of at least one of the first rear wheel angle compensation factor and the second rear wheel angle compensation factor. Since processes for these are described above, detailed descriptions thereof will be omitted herein.

When calculating at least one of the first rear wheel angle compensation factor and the second rear wheel angle compensation factor, the control unit 40 may calculate the first rear wheel angle compensation factor only when the steering torque is equal to or larger than a predetermined reference torque, and may calculate the second rear wheel angle compensation factor only when the steering angle velocity is equal to or larger than a predetermined reference angle velocity.

The control unit 40 calculates a target rear wheel angle based on the front wheel angle, the rear wheel angle compensation factor and the same/opposite phase gain (S40). Namely, the target rear wheel angle is calculated based on at least one of the first rear wheel angle compensation factor and the second rear wheel angle compensation factor, the front wheel angle and the same/opposite phase gain.

In this regard, in order to calculate a target rear wheel angle with improved rear wheel steering responsiveness, the target rear wheel angle may be calculated in consideration of both the first rear wheel angle compensation factor and the second rear wheel angle compensation factor.

In order to improve rear wheel steering responsiveness, the control unit 40 may calculate a target rear wheel angle in additional consideration of a rear wheel steering gain as a parameter for proportionally controlling a rear wheel angle depending on a steering angle. Accordingly, the control unit 40 may finally calculate a target rear wheel angle based on the front wheel angle, the first and second rear wheel angle compensation factors, the same/opposite phase gain and the rear wheel steering gain.

The control unit 40 transfers the target rear wheel angle to the rear wheel driving unit 50 and thereby actuates the rear wheel driving unit 50 (S50). According to this fact, the rear wheel driving unit 50 steers the rear wheels through an RWS actuator (not shown) and a speed reducer (not shown) such that an angle of the rear wheels becomes the target rear wheel angle.

As is apparent from the above descriptions, according to the embodiments of the present disclosure, by quickly identifying the avoidance steering intention of a driver through a steering torque and a steering angle velocity and discriminatively compensating a rear wheel angle at an opposite phase and the same phase in consideration of a same/opposite phase gain depending on a vehicle speed, steering responsiveness may be momentarily improved even when a vehicle travels at a low speed, a medium speed and a high speed, whereby it is possible to effectively prevent a collision with an obstacle.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling rear wheel steering, comprising:
   a steering angle sensor detecting a steering angle of a steering wheel;
   a vehicle speed sensor detecting a vehicle speed of a vehicle;
   a steering torque sensor detecting a steering torque applied to a steering shaft; and
   a control unit calculating a front wheel angle and a steering angle velocity from the steering angle detected by the steering angle sensor, calculating a rear wheel angle compensation factor for improving rear wheel steering responsiveness based on at least one of the steering torque detected by the steering torque sensor and the calculated steering angle velocity and a same/opposite phase gain depending on the vehicle speed detected by the vehicle speed sensor, and calculating a target rear wheel angle based on the front wheel angle, the rear wheel angle compensation factor and the same/opposite phase gain.

2. The apparatus according to claim 1,
   wherein the rear wheel angle compensation factor comprises a first rear wheel angle compensation factor which is calculated based on the steering torque, predetermined steering torque-compensation factor relationship information and the same/opposite phase gain and a second rear wheel angle compensation factor which is calculated based on the steering angle velocity, predetermined steering angle velocity-compensation factor relationship information and the same/opposite phase gain, and
   wherein the control unit calculates at least one of the first rear wheel angle compensation factor and the second rear wheel angle compensation factor, and calculates the target rear wheel angle based on at least one of the calculated first rear wheel angle compensation factor and second rear wheel angle compensation factor, the front wheel angle and the same/opposite phase gain.

3. The apparatus according to claim 2, wherein, in the case where a steering direction of rear wheels determined through the same/opposite phase gain is a phase opposite to a steering direction of front wheels, the control unit calculates at least one of the first rear wheel angle compensation factor and the second rear wheel angle compensation factor such that a larger target rear wheel angle is calculated by calculating the target rear wheel angle in consideration of at least one of the first rear wheel angle compensation factor and the second rear wheel angle compensation factor.

4. The apparatus according to claim 2, wherein, in the case where a steering direction of rear wheels determined through the same/opposite phase gain is a phase the same as a steering direction of front wheels, the control unit calculates at least one of the first rear wheel angle compensation factor and the second rear wheel angle compensation factor such that a smaller target rear wheel angle is calculated by calculating the target rear wheel angle in consideration of at least one of the first rear wheel angle compensation factor and the second rear wheel angle compensation factor.

5. The apparatus according to claim 2, wherein, when calculating at least one of the first rear wheel angle compensation factor and the second rear wheel angle compensation factor, the control unit calculates the first rear wheel angle compensation factor only when the steering torque is equal to or larger than a predetermined reference torque and calculates the second rear wheel angle compensation factor only when the steering angle velocity is equal to or larger than a predetermined reference angle velocity.

6. The apparatus according to claim 1, wherein, when calculating the target rear wheel angle, the control unit calculates the target rear wheel angle in additional consideration of a rear wheel steering gain depending on the steering angle.

7. A method for controlling rear wheel steering, comprising:

receiving a steering angle, a vehicle speed and a steering torque from a steering angle sensor, a vehicle speed sensor and a steering torque sensor, respectively, and calculating a front wheel angle and a steering angle velocity from the received steering angle, by a control unit;

calculating a rear wheel angle compensation factor for improving rear wheel steering responsiveness, based on at least one of the steering torque and the steering angle velocity and a same/opposite phase gain depending on the vehicle speed, by the control unit; and calculating a target rear wheel angle based on the front wheel angle, the rear wheel angle compensation factor and the same/opposite phase gain, by the control unit.

8. The method according to claim 7, wherein the rear wheel angle compensation factor comprises a first rear wheel angle compensation factor which is calculated based on the steering torque, predetermined steering torque-compensation factor relationship information and the same/opposite phase gain and a second rear wheel angle compensation factor which is calculated based on the steering angle velocity, predetermined steering angle velocity-compensation factor relationship information and the same/opposite phase gain, and wherein, in the calculating of the rear wheel angle compensation factor, the control unit calculates at least one of the first rear wheel angle compensation factor and the second rear wheel angle compensation factor, and wherein, in the calculating of the target rear wheel angle, the control unit calculates the target rear wheel angle based on at least one of the calculated first rear wheel angle compensation factor and second rear wheel angle compensation factor, the front wheel angle and the same/opposite phase gain.

9. The method according to claim 8, wherein, in the calculating of the rear wheel angle compensation factor, in the case where a steering direction of rear wheels determined through the same/opposite phase gain is a phase opposite to a steering direction of front wheels, the control unit calculates at least one of the first rear wheel angle compensation factor and the second rear wheel angle compensation factor such that a larger target rear wheel angle is calculated by calculating the target rear wheel angle in consideration of at least one of the first rear wheel angle compensation factor and the second rear wheel angle compensation factor.

10. The method according to claim 8, wherein, in the calculating of the rear wheel angle compensation factor, in the case where a steering direction of rear wheels determined through the same/opposite phase gain is a phase the same as a steering direction of front wheels, the control unit calculates at least one of the first rear wheel angle compensation factor and the second rear wheel angle compensation factor such that a smaller target rear wheel angle is calculated by calculating the target rear wheel angle in consideration of at least one of the first rear wheel angle compensation factor and the second rear wheel angle compensation factor.

11. The method according to claim 8, wherein, in the calculating of the rear wheel angle compensation factor, when calculating at least one of the first rear wheel angle compensation factor and the second rear wheel angle compensation factor, the control unit calculates the first rear wheel angle compensation factor only when the steering torque is equal to or larger than a predetermined reference torque and calculates the second rear wheel angle compensation factor only when the steering angle velocity is equal to or larger than a predetermined reference angle velocity.

12. The method according to claim 8, wherein, in the calculating of the target rear wheel angle, the control unit calculates the target rear wheel angle in additional consideration of a rear wheel steering gain depending on the steering angle.

* * * * *